Inventor
Robert T. Haslam
By Ellis Spaugh
Attorney

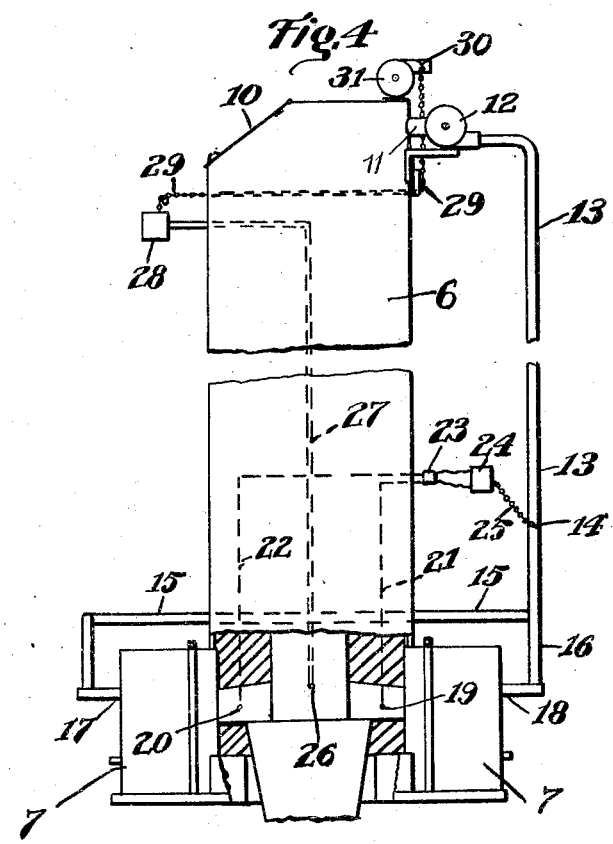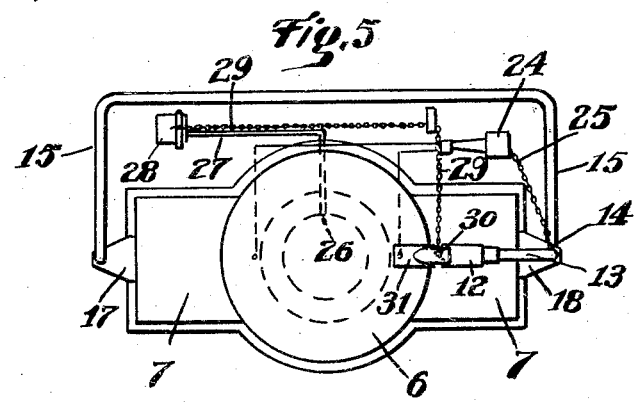

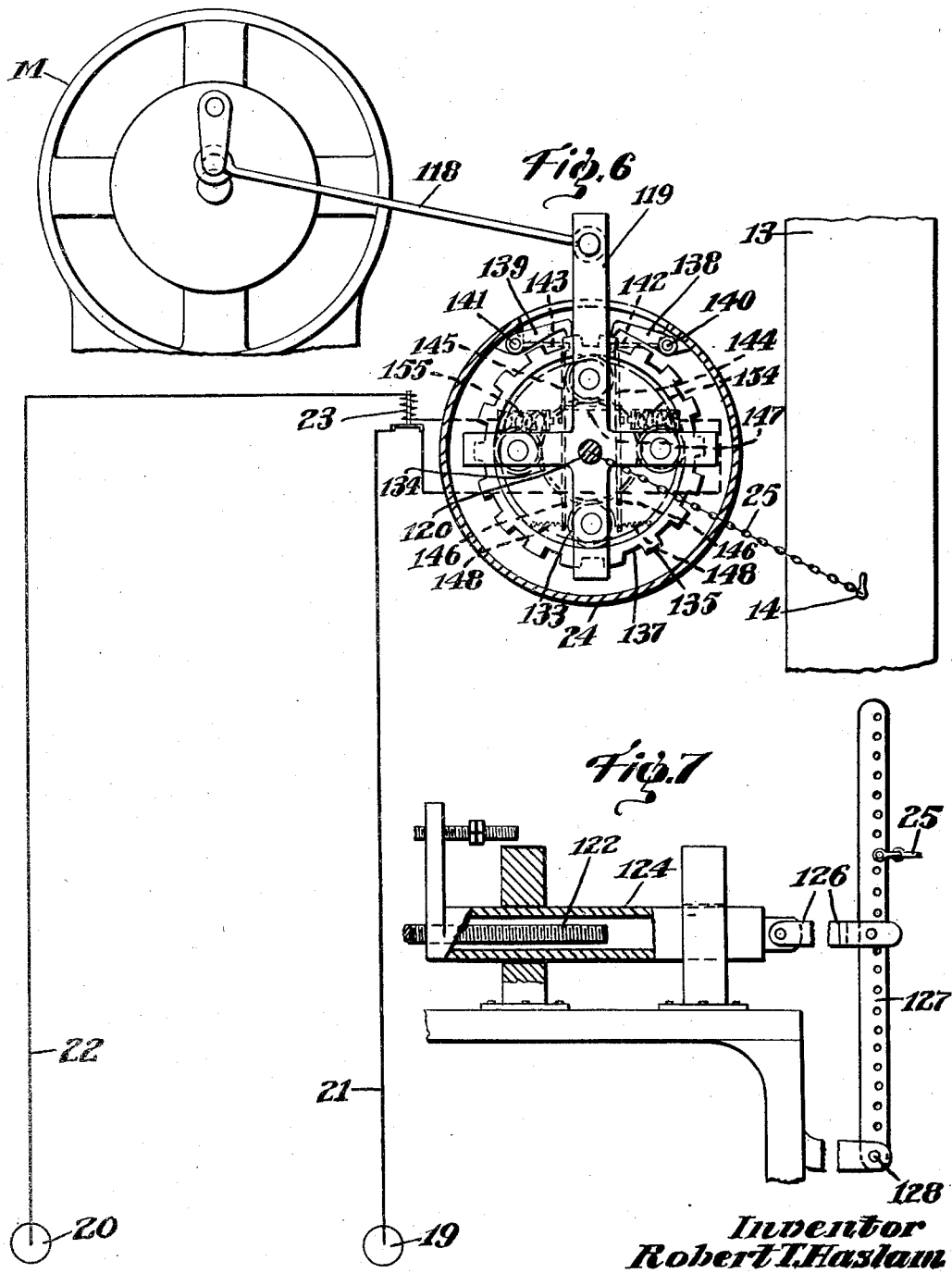

Patented Nov. 17, 1931

1,832,552

UNITED STATES PATENT OFFICE

ROBERT THOMAS HASLAM, OF BELMONT, MASSACHUSETTS, ASSIGNOR TO ROCKLAND & ROCKPORT LIME CORPORATION, OF ROCKLAND, MAINE, A CORPORATION OF MAINE

LIME KILN

Application filed December 27, 1926. Serial No. 157,100.

In the burning of lime, it has heretofore been recognized that the qualities of wood burned lime were desirable and it has been attempted at different times to produce these qualities in lime burned with other fuels.

In the commercial development of lime burning, certain other desiderata have imposed themselves on the industry from time to time, but these factors so much desired in themselves are frequently found to be so in conflict with each other as to be unattainable in any one practical method of operation.

It has long been recognized that the burning of lime at higher temperatures produces undesirable effects and was generally referred to as overburning.

In such overburning the particles are more or less sintered and fused and shrink together with the result that the plasticity of hydrate made from such lime is low, the volume of the lime putty yield is small and the lime loses much of its quickness in slaking. As the temperature at which the lime is burned is lowered, the plasticity, the putty volume and quickness all improve until finally the optimum temperature is reached after which the quality of the lime falls off.

In connection with the approximation of wood burned lime, it has been proposed in the art to so regulate the combustion of high temperature fuel as to hold the stack temperature to those regions normal to wood burning. This has been attempted in various ways, one of the most common and obvious being that of highly skilled firing by which the stoker attempted to prejudge approaching temperatures and maintain a constant temperature without permitting an unfavorable drop. This was obviously difficult even with the most skillful fireman.

In another phase of development it has been proposed to utilize the stack gases by conducting them to the fire box to regulate the temperature in the stack.

My invention contemplates a general increase in efficiency, particularly in the actual combustion of the fuel, while making possible the highly desired low temperature burning of the lime as before mentioned.

Briefly, I am able in accordance with my invention to burn my fuel with maximum economy, using an automatic stoker, and yet utilize the varying heat which has heretofore prohibited the use of such a system of burning and so utilize it as to secure any desired stack condition required in the production of the lime.

In the process and apparatus which I will proceed to discuss as illustrative I am consciously showing in various parts, apparatus which is generally old and of more or less accepted type, but I am combining these in what I believe to be a novel combination for the production of results which have heretofore never been attained either as to efficiency or economy. In the drawings:

Fig. 4 is an elevation showing diagrammatically the automatic controls.

Fig. 5 is a plan view of Fig. 4, and

Figs. 6 and 7 are views of the automatic regulators used.

Figure 1:
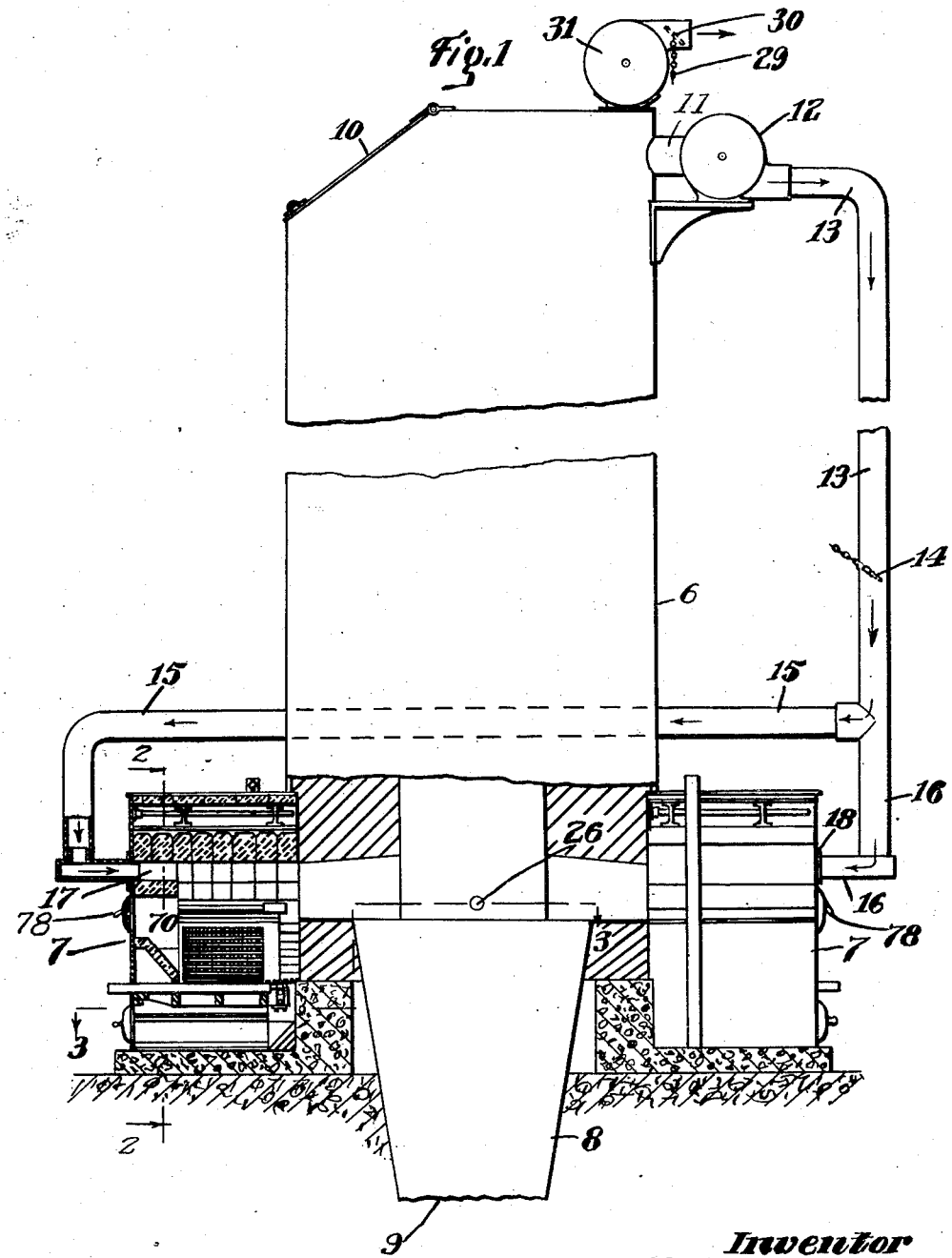
Fig. 1 is an elevation partly in section of a lime kiln and automatic stoker of conventional type equipped for the practice of my invention.
Figure 2:
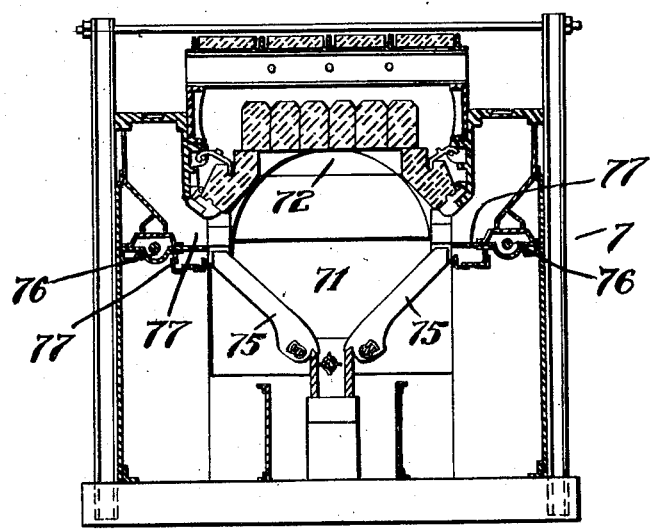
Fig. 2 is a section on the line 2—2 of Fig. 1.
Figure 3:
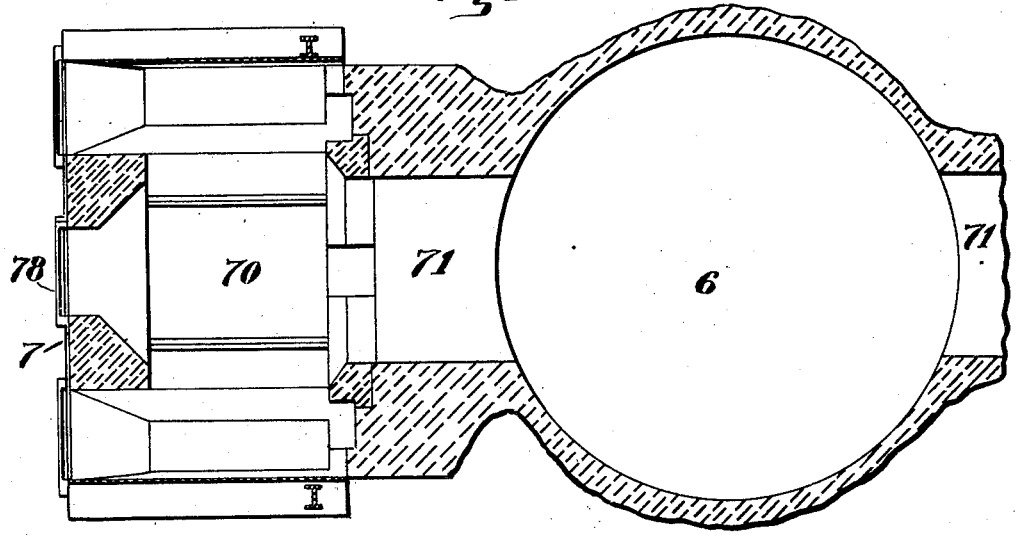
Fig. 3 is a section on the line 3—3 of Fig. 1.

I have indicated at 6 the stack of a lime kiln of conventional type having the usual firing furnaces 7, cooling cone 8, and charging door 10. Each furnace 7 is preferably equipped with an automatic stoker of standard type as for example a Murphy automatic, adapted for burning a constantly fed high temperature fuel as coal which under normal draft produces a maximum combustion efficiency regardless of the resultant thermal variation. By appropriate variation of burner equipment, however, I may use any solid, liquid or gaseous fuel yielding products of combustion at temperatures in excess of these at which lime may be properly burned and which excess temperatures are reduced by diluting the products of combustion with waste flue gases.

The furnaces 7 are disposed on either side of the stack 6 with their combustion chambers 70 connecting with the stack through lateral eyes 71. The stoker structure indicated is a standard commercial stoker and is referred to herein as of V-shaped type of grate.

The furnace doors 78 are alined with the eyes 71 and this arrangement in connection with the V-shaped grates permits convenient access to the stack 6 for purposes of cleaning out the same in case of clogging or fouling.

In connection with the furnaces and automatic stokers, I provide means for conducting non-combustible flue gases to the furnaces above the fuel surfaces thereof so as to provide a thermal dilution of the products of combustion in advance of their delivery to the stack, together with automatic means for controlling the admission of said flue gases according to the needs of the furnaces. As a further element of the indicated combination, I provide means for automatically regulating the draft of the stack according to reduction of the pressure and my combination secures an isothermic stack condition regardless of thermal-variations in the free burning of the automatically fed fuel.

To accomplish this result, the stack 6 is provided near its upper end with a flue gas recirculating pipe 11 connected with a recirculating fan 12. This fan forces the gases through the pipe 13 which is damper-controlled, as at 14, and is provided with branches 15 and 16 which discharge at 17 and 18 into the furnaces above the fuel surfaces, and below the flat suspended arches 72 thereof. This not only permits the introduction into the furnaces of a relatively cooler volume of flue gases which reduces the temperature of the gases from the furnace after fuel combustion and in advance of their delivery to the stack, but cools the arches 72 and prevent them from burning out.

The volume of recirculated flue gases delivered into the furnaces is thermostatically controlled according to the needs of the stack.

As shown, I provide in each furnace a pyrometer 19 and 20 which are electrically connected by the lead wires 21 and 22 to the relay control 23 of an automatic regulator 24, which in turn is connected by the flexible connection 25 with the damper 14 in the recirculating pipe 13.

The automatic regulator 24 may be of any desired type but is preferably a Packard regulator, U. S. Patent No. 1,681,307, granted August 21, 1928, such as is used as standard equipment in many lime-burning kilns to maintain the temperature at substantially a predetermined point or within certain predetermined limits, the arrangement being such that upon a variation of the temperature, as indicated by the pyrometers, the damper 14 will be automatically opened or closed, as the case may be, proportionally to regulate the admission of the recirculated flue gases into the furnaces.

Any desired form of automatic regulator 24 may be employed in connection with the pyrometers 19 and 20 and relay 23. I have shown in these drawings (Figs. 6 and 7) an automatic regulator of the Packard type, and the thermo-couple 19 and 23 intermittent or duplex relay 23 are of standard type, being preferably instruments of standard manufacture made by the Brown Instrument Company. The alternately acting members 19 and 20 of the thermo-couple alternately close the relay circuit so that the relay current is transmitted to one or the other of the pawls 138 and 139 of the Packard regulator. The relay is set for a predetermined temperature, as for example 2200° F. and the pyrometer current is ineffective below the relay setting.

The pawls 138 and 139 of the Packard regulator are mounted on rock shafts 140 and 141 respectively, which shafts are provided at their outer ends with suitable trip arms 142 and 143 normally supported on the upper ends of a pair of spring tensioned armature levers 144 and 145 respectively, fulcrumed at 146, linked together at 147, spring tensioned as at 148, and disposed opposite the armatures of a pair of electro-magnets 154 and 155 connected with the relay 23.

The pawls cooperate with a continuously oscillating ratchet in the form of a peripherally notched ring gear 135, the notches of which are indicated at 137. The ring gear 135 is fast on a driving shaft 120 to which is also keyed a central gear 134 meshing with a plurality of pinions 133, the shafts of which are journaled in a pair of oscillating yokes 119. The ring gear encloses the pinions and is internally toothed to mesh therewith. The yokes 119 are constantly oscillated back and forth under the throw of a crank 117 which is fast on a power shaft 114 and is linked by a pitman 118 to the pair of yokes. The shaft 114 is driven from any suitable motor M and the shaft 120 on which the yokes 119 are loosely mounted is coupled to a feed screw 122 adapted to advance or retract the feed nut 124 according to the direction in which said screw is rotated. The feed nut 124 is linked at 126 to a valve control lever 127 which is fulcrumed at 128 and operatively connected at 25 to the damper 14.

In operation, the power shaft 114 is constantly rotated and through the crank connection 117 constantly oscillates the yokes 119 carrying the pinions 133 and ring gear 135 back and forth relative to the central gear 134 on the driving shaft 120. This motion is an idle motion however and no driving influence is imparted to the central gear 134 and thus to the driving shaft 120 and feed screw 122, due to the fact that in this position of the parts both trip arms 142 and 143 for the pawls 138 and 139 are supported on the armature levers 144 and 145. Upon a variation of the temperature as indicated by the alternately acting elements of the thermo-couple 19 and 20, the circuit is closed to the relay and the relay current is transmitted to the regulator to withdraw one or the other of the levers 144 or 145 from beneath the corresponding trip arm 142 or 143, allowing such trip arm to drop by gravity and one or the other of the pawls 138 and 139 to drop into one of the notches 137 of the ring gear 135 so as to check the oscillatory motion of said gear in its clockwise direction. The pinions 133 now begin to rotate about their axes in a counter-clockwise direction and to travel bodily in a clockwise direction around the ring gear thereby rotating the central gear 134 in a clockwise direction during the full throw of the yokes 119 in their clockwise movement and thus rotating the feed screw 122 clockwise through a part of a revolution. This rotation of the feed screw, through the feed nut 124 and operating connections 25, 126 and 127 moves the damper 14 in the appropriate direction, i. e. towards its closed or its open position according to whether the temperature is lowered or raised.

Inasmuch as the volume of cooler flue gases admitted into the furnaces will have an effect upon the draft whether normal or forced, I provide means for automatically regulating the draft according to the pressure at the base of the kiln. To this end, the kiln is tapped by a draft pressure port 26 which connects through an open pipe 27 with a pressure regulator 28 preferably of the type of the regulator 24, but pressure controlled instead of electrically controlled as in the case of the regulator 24. This regulator 28 is conected by a flexible connection 29 with the damper 30 of an exhaust fan 31 adjacent the top of the stack, so that the regulator 28 will hold the draft at 26 constant or practically constant, regardless of variations in the volume of recirculated flue gases admitted through the pipe 11 over the fuel surfaces of the furnaces and regardless of resultant variations in furnace or kiln. The pressure regulator 28 operates in substantially the same manner as does the regulator 24 so that no specific description thereof is thought necessary. The pressure regulator 28 however includes a standard Bristol bellows which makes an electric contact in a relay similar to the relay 23 to operate the Packard regulator in one direction or another whereby to regulate the pull of the draft in the kiln.

In operation the regulator 28 holds the draft at 26 constant or practically constant at all times. Upon a rise of temperature in the furnaces, as indicated by the pyrometers 19 and 20, the regulator 24 operates to open the damper 14 and thereby proportionately admit a portion of the cooler recirculated flue gases through ports 17 and 18 into the furnaces above the fuel surfaces thereof. These recirculated gases not only reduce the temperature of the combustion gases but cool off the fire arches 72 to prevent them from burning out. As a result of the admission of these cooler recirculated gases, the pressure within the furnaces is increased, but this variation is automatically taken care of by the regulator 28 which acts to hold the draft at the eyes 71 constant or practically constant at all times. Thus the apparatus is fully automatic under all the varying conditions met with in approximating the qualities of wood burned lime in lime burned with other fuels.

Various modifications in the method and apparatus may obviously be resorted to, all without departing from the spirit of my invention if within the limits of the appended claims.

What I therefore claim and desire to secure by Letters Patent is:

1. In lime burning apparatus, a kiln having a flat arched furnace connected therewith, a flue gas recirculating system having a delivery transversely beneath the furnace arch from side to side thereof for introducing the flue gas in cooling relation thereto, a control for regulating the flow of recirculated gas, a pyrometer disposed in the kiln adjacent the furnace connection, a temperature regulator for the flue gas control operatively connected with said pyrometer so as to be subject to pyrometric variations, a pressure regulator operatively connected to the kiln chamber adjacent the furnace connection so as to be subject to gas pressure variations, and a stack draft control operatively connected to said pressure regulator.

2. In lime burning apparatus, a kiln having a flat arched furnace connected therewith, a flue gas recirculating system having a delivery transversely beneath the furnace arch from side to side thereof for introducing the flue gas in cooling relation thereto, a control for regulating the flow of recirculated gas, a pyrometer disposed in the kiln adjacent the furnace connection, and a temperature regulator for the flue gas control operatively connected with said pyrometer so as to be subject to pyrometric variations.

In testimony whereof I affix my signature.

ROBERT THOMAS HASLAM.